United States Patent [19]

Bedell

[11] Patent Number: 5,167,941

[45] Date of Patent: *Dec. 1, 1992

[54] QUATERNARY POLYAMINES AS SULFITE OXIDATION INHIBITORS IN AMINE SCRUBBING OF SO$_2$

[75] Inventor: Stephen A. Bedell, Lake Jackson, Tex.

[73] Assignee: The Dow Chemical Company, Midland, Mich.

[*] Notice: This portion of the term of this patent subsequent to May 28, 2008, has been disclaimed.

[21] Appl. No.: 623,313

[22] Filed: Dec. 6, 1990

Related U.S. Application Data

[63] Continuation-in-part of Ser. No. 546,075, Jun. 29, 1990, Pat. No. 5,019,365, which is a continuation-in-part of Ser. No. 277,159, Nov. 29, 1988, abandoned.

[51] Int. Cl.$^5$ ............................................. C01B 17/00
[52] U.S. Cl. .............................. 423/242.2; 423/243.05
[58] Field of Search ......................................... 423/243

[56] References Cited

U.S. PATENT DOCUMENTS

| | | | |
|---|---|---|---|
| 3,294,827 | 12/1966 | Swanson | 252/401 |
| 3,801,699 | 4/1974 | Arnold | 423/244 |
| 3,873,673 | 3/1975 | Teaque et al. | 423/243 |
| 4,310,438 | 1/1982 | Steelhammer | 252/401 |
| 4,324,775 | 4/1982 | Tung | 423/539 |
| 4,342,733 | 8/1982 | Steelhammer | 423/242 |
| 4,363,791 | 12/1982 | Trentham et al. | 423/243 |
| 4,387,037 | 6/1983 | Trentham et al. | 252/184 |
| 4,530,704 | 7/1985 | Jones et al. | 55/48 |
| 4,767,860 | 8/1988 | Dunmore et al. | 544/384 |
| 4,783,327 | 11/1988 | Treybig et al. | 423/243 |
| 4,814,443 | 3/1989 | Treybig et al. | 540/492 |
| 4,814,447 | 3/1989 | Treybig et al. | 544/384 |
| 4,818,506 | 4/1989 | Lin et al. | 423/242 |
| 5,019,365 | 5/1991 | Bedell | 423/243 |

OTHER PUBLICATIONS

Vostreil et al., Commercial Organic Flow Sauts, 1976, pp. 1-75.

Hess et al., J. Amer. Chemical Society, vol. 100, p. 6252 (1978).

*Primary Examiner*—Gregory A. Heller

[57] ABSTRACT

Inhibitors of oxidation of sulfites to sulfates in sulfur dioxide scrubbing solutions are disclosed. The inhibitors are cationic polyelectrolytes which are water soluble, have a molecular weight of at least 10,000 daltons and contain quaternary amine groups. The polyelectrolytes are preferably present at 1-3000 ppm in alkali solutions with which a sulfur dioxide containing gas stream is contacted. The scrubbing solutions contain amines such as piperazinones, morpholinones, piperidines, piperazines, piperazinediones, hydantoins, triazinones, pyrimidinones, oxazolidones, N-carboxymethyl ethylenediamines, etc.

39 Claims, No Drawings

QUATERNARY POLYAMINES AS SULFITE OXIDATION INHIBITORS IN AMINE SCRUBBING OF SO₂

CROSS-REFERENCE TO RELATED APPLICATIONS

This is a continuation-in-part of copending application U.S. Ser. No. 07/546,075, filed Jun. 29, 1990, now U.S. Pat. No. 5,019,367 which is a continuation-in-part of U.S. Ser. No. 07/277,159, filed Nov. 29, 1988, now abandoned.

FIELD OF THE INVENTION

The present invention relates to alkali scrubbing solutions for sulfur dioxide absorption, and more particularly to such scrubbing solutions containing cationic polyelectrolytes to inhibit oxidation of sulfite to sulfate in the scrubbing solution. The invention also relates to an improvement in a process for removing sulfur dioxide from a gas stream wherein the gas stream containing the sulfur dioxide is contacted with an aqueous alkali solution, and more specifically to the improvement wherein a cationic polyelectrolyte is employed to inhibit oxidation of sulfite to sulfate.

BACKGROUND OF THE INVENTION

From U.S. Pat. No. 4,310,438, it is known to add water-soluble polyethyleneamines having at least one secondary amine and two primary amines to a sulfite-containing aqueous medium for reducing the oxidation of sulfite to sulfate therein. The sulfite-containing medium with the polyethyleneamine additive is thus useful in wet scrubber systems for sulfur dioxide absorption from a gas containing the same.

It is also known from U.S. Pat. No. 4,342,733 to use a topping agent selected from the group consisting of polyphosphate compounds and organophosphonic acid compounds in a scrubbing liquor to supplement and enhance the antioxidant activity of sulfite antioxidant agents such as the linear polyethyleneamines and substituted secondary and tertiary aromatic amines.

One problem with the polyethyleneamine sulfite antioxidants employed in the prior art is that the polyethyleneamines are generally volatile to some extent, particularly the lower molecular weight polyethyleneamines such as triethylenetetramine and tetraethylenepentamine. This results in process losses from the sulfur dioxide scrubbing system and can also pose an odor problem. In addition, such amines can be difficult for waste water treatment systems to tolerate, and therefore, disposal of spent scrubbing solution from systems employing the polyethyleneamines is complicated. For example, the lower molecular weight polyethyleneamines are not retained on ultrafiltration membranes.

Another problem with the polyethyleneamines as additives for sulfite oxidation inhibition is that they readily complex with metals, and it is necessary to add additional quantities of the polyethyleneamines to the scrubbing liquor when metals and other cations are present in the scrubbing liquor. Since the oxidation of sulfite to sulfate is trace-metal catalyzed, and suppressed by metal complexing agents as described in Huss, Jr., et al., *J. Amer. Chem. Soc.*, v. 100, p. 6252 (1978), an explanation for the anti-oxidant properties of such polyethyleneamines is that they complex with any metal ions which may be present in the scrubbing liquor to inhibit such catalysis, and do not function as true antioxidants.

It is known from U.S. Pat. No. 4,530,704 to use a process for selectively removing and recovering sulfur dioxide for a gas stream containing the same by contacting the gas with absorbent (aqueous piperazine, piperazinone or a morpholinone) and thermally regenerating the absorbent (releasing the sulfur dioxide) for reuse in the contacting step.

It is also known from U.S. Pat. No. 4,783,327 to use a method of removing sulfur dioxide from a gas stream containing the same by absorbing the sulfur dioxide in an aqueous solution containing a 4-(2-hydroxyalkyl)-2-piperazinone compound or alkyl or aryl substituted derivative thereof. These compounds provide an absorbent solution which is less subject to loss during the regeneration step and yet effectively removes the sulfur dioxide from the gas stream without interference from other associated gases.

In commonly assigned application Ser. No. 569,117, filed Aug. 16, 1990, entitled "Process for Absorption of Sulfur Compounds from Fluids," (applicants Dane Chang and Steven H. Christiansen), there is disclosed a process wherein sulfur dioxide is removed from a fluid containing $SO_2$ by employing as an absorbent for the $SO_2$ an aqueous solution of a compound represented by the formula:

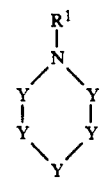

wherein each Y is independently $-(CR^2_2)-$, $-(CR^2)=$ or $-(C=O)-$ and each $R^1$ and $R^2$ is independently hydrogen; an alkyl group; a hydroxyalkyl group; an aldehyde group; a carboxylic acid group or salt thereof; or an alkyl group containing at least one carboxylic ester, a carboxylic acid or salt thereof, ether, aldehyde, ketone, or sulfoxide group; wherein the compound has at least one carbonyl group. Representative of such absorbents are 2-piperidone and ethyl piperidone 2-carboxylate.

In commonly assigned application Ser. No. 569,120, filed Aug. 16, 1990, entitled "Process for Absorption of Sulfur Compounds from Fluids" (applicants Steven H. Christiansen, Dane Chang and Druce K. Crump), there is described a process wherein sulfur dioxide is removed from a fluid containing $SO_2$ by employing as an absorbent therefore an aqueous solution of a compound represented by the formulae:

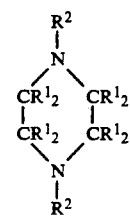

wherein each $R^1$ and $R^2$ is independently hydrogen; an alkyl group; a hydroxyalkyl group; an aldehyde group; a carboxylic acid or salt group; or an alkyl group containing at least one carboxylic ester, carboxylic acid or salt, ether, aldehyde, ketone or sulfoxide; and wherein at least $R^1$ or $R^2$ is carbonyl-containing group, such as an aldehyde group, a carboxylic acid containing group, a carboxyl ester group, or a ketone-containing group; or

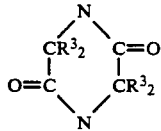

wherein each $R^3$ is independently hydrogen; an alkyl group; a hydroxyalkyl group; an aldehyde group; or a carboxylic ester, a carboxylic acid or salt, ether, aldehyde, ketone or sulfoxide group. Representative of such absorbents are ethyl-1-piperazine carboxylate, 1,4-diformyl piperazine, 1-succinyl piperazine, glycine anhydride, and 1,4-dimethyl-2,5-piperazinedione.

In commonly assigned application Ser. No. 569,091, filed Aug. 16, 1990, entitled "Process for Absorption of Sulfur Compounds from Fluids" (applicants Steven H. Christiansen, Dane Chang and David A. Wilson), there is described a process wherein sulfur dioxide is removed from a fluid containing $SO_2$ by employing as an absorbent therefore an aqueous solution of a compound represented by the formula:

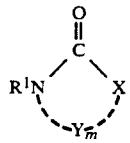

wherein X is —O—, —$NR^1$—, or —N=; each Y is independently —($CR^2{}_2$)—, —(C=O)—, —O—, $NR^1$—, —N=, or —C($R^2$)=; each $R^1$ and $R^2$ is independently hydrogen; an alkyl group; a hydroxyalkyl group; an aldehyde group; a carboxylic acid or salt group; or an alkyl group containing an aldehyde group, a carboxylic acid or salt group, ketone, carboxylic ester, ether, or sulfoxide group; and m is an integer, preferably of from 2 to about 4. Representative of such absorbents are hydantoin, $N^2,N^3$-dimethylpropyleneurea, trialkyl-1,3,5-triazine-2,4,6(1H,3H,5H)trione, and 2-oxazolidone In commonly assigned application Ser. No. 569,118, filed Aug. 16, 1990, entitled "Process for Absorption of Sulfur Compounds from Fluids" (applicants Dane Chang, Steven H. Christiansen and David A. Wilson), there is described a process for removing $SO_2$ from a fluid containing $SO_2$ by employing as an absorbent for the $SO_2$ an admixture of water and a compound represented by the formula:

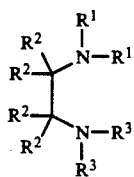

wherein each $R^1$, $R^2$ or $R^3$ is independently hydrogen; an alkyl group; a carboxylic acid group; a hydroxyalkyl group; an aldehyde group; or an alkyl group containing a carboxylic ester, a carboxylic acid or salt, ether, aldehyde, ketone or sulfoxide group; wherein at least one of $R^1$ and $R^3$ is a carboxymethyl group and at least one of $R^1$ and $R^3$ is hydrogen, preferably at least one $R^1$ is carboxymethyl and at least one $R^3$ is hydrogen. Representative of such absorbents is symmetrical ethylenediaminediacetic acid.

It is known from U.S. Pat. No. 4,324,775 to use a water-immiscible organic solution of a hydrophobic primary, secondary, tertiary or quaternary amine salt as a sulfite transfer agent for contacting an $SO_2$-pregnant aqueous alkali $SO_2$ scrubbing solution to enhance $SO_2$ scrubbing. The organic solution is subsequently heated to release $SO_2$ in a stripping step, and then recontacted with the aqueous alkali scrubbing solution to regenerate the aqueous solution for recycle to the scrubbing step wherein gaseous $SO_2$ is contacted with the regenerated aqueous alkali $SO_2$ scrubbing solution.

Other sulfur dioxide absorption solvents, buffers and methods are described in various references, such as, for example, U.S. Pat. Nos. 4,387,037; 4,363,791; and 3,873,673.

SUMMARY OF THE INVENTION

The present invention resides in the discovery that quaternary polyamine electrolytes serve as oxidation inhibitors in sulfite solutions. Since these additives are polymeric in nature, they are less volatile than the lower molecular weight polyethyleneamines, and hence, less likely to be lost from the scrubbing liquor through evaporation, and the use thereof in alkali scrubbing systems substantially avoids the odor problems associated with the polyethyleneamines. The polymeric electrolytes of the present invention are widely used as government-approved flocculating agents for water treatment systems, and thus do not complicate disposal of the spent scrubbing liquor. The antioxidant additives of the present invention can also be recovered, if desired, by the use of ultrafiltration membranes since the high molecular weight additives of the present invention are retained thereby. A further advantage is that the quaternary polyamine electrolytes of the present invention will not complex metal ions, and can thus be used in the presence of metal ions without substantially affecting the effectiveness thereof as sulfite oxidation inhibitors.

Broadly, the present invention provides an aqueous sulfur dioxide scrubbing solution comprising an aqueous alkali solution suitable for scrubbing gaseous sulfur dioxide. The solution contains sulfite and a cationic polyelectrolyte in an amount effective to inhibit oxidation of the sulfite to sulfate, wherein the polyelectrolyte is a water soluble polymer containing quaternary amine groups.

In another aspect of the invention, there is provided, in a process for removing sulfur dioxide from a gas stream wherein the gas stream containing the sulfur dioxide is contacted with an aqueous alkali solution, the improvement wherein the alkali solution contains an effective amount of a cationic polyelectrolyte to inhibit oxidation of sulfites to sulfates, and wherein the polyelectrolyte is a water soluble polymer containing quaternary amine groups.

DETAILED DESCRIPTION OF THE INVENTION

The present invention is generally applicable to any sulfite-containing aqueous gas scrubbing medium, and also to alkali solutions used to prepare such a medium. For example, the sulfite oxidation inhibitor of the present invention may be used in sulfite solutions per se which are used to scrub sulfur dioxide gases, as well as in alkali or caustic solutions which are used for this purpose, such as, for example, caustic soda, potash, ammonium hydroxide, lime, limestone, amines and the like.

Amine-based aqueous sulfur dioxide scrubbing solutions are a preferred embodiment of the present invention. Sulfur dioxide scrubbing with aqueous amines, such as piperazinone and morpholinone compounds, is well known in the art, and is described, for example, in U.S. Pat. Nos. 4,530,704 to Jones et al. and 4,783,327 to Treybig et al., both of which are incorporated herein by reference. Piperazinone and morpholinone compounds are particularly preferred amines. Suitable piperazinone/morpholinone compounds have the general formula:

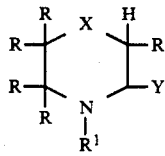

wherein X is oxygen or >NR$^2$; Y is H$_2$ or oxygen; R is hydrogen, an alkyl group having one to six carbon atoms or aryl or aralkyl group having from six to twelve carbon atoms; R$^1$ is hydrogen, an alkyl or hydroxyalkyl group having from one to six carbon atoms, or an aryl or aralkyl group having from six to twelve carbon atoms; and R$^2$ is R$^1$, or preferably a 2-hydroxyethyl group of the formula:

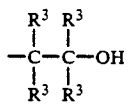

wherein R$^3$ is hydrogen or an alkyl group having one or two carbon atoms. Suitable 4-(2-hydroxyalkyl)-2-piperazinones include 4-(2-hydroxyethyl)-2-piperazinone, 4-(2-hydroxyethyl)-1-methyl-2-piperazinone, 4-2(2-hydroxyethyl))-3-methyl-2-piperazinone, 4-(2-hydroxyethyl)-5-methyl-2-piperazinone, 3-ethyl-4-(2-hydroxyethyl)-2-piperazinone, 3-ethyl-4-(2-hydroxyethyl)2-piperazinone, 6-ethyl-4-(2-hydroxyethyl)-2-piperazinone, 4-(2-hydroxy-ethyl)-5,6-dimethyl-2-piperazinone, 1-ethyl-4-(2-hydroxy-ethyl)-2-piperazinone, 4-(2-hydroxyethyl)-3-phenyl-2-piperazinone, 1,4-bis(2-hydroxyethyl)-2-piperazinone, 4-(2-hydroxyethyl)-2-piperazinone, 4-(2-hydroxypropyl)-2-piperazinone, 4-(2-hydroxybutyl)-2-piperazinone and 4-(2-hydroxypropyl)-6-methyl-2-piperazinone.

Another preferred class of scrubbing amines includes piperidines having carbonyl groups, preferably compounds of the formula:

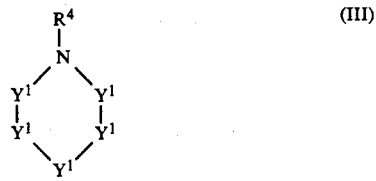

wherein each Y$^1$ is independently —(CR$^5{}_2$)—, —(CR$^5$)= or —(C=O)—; and each R$^4$ and R$^5$ is independently hydrogen; and alkyl group; a hydroxyalkyl group; an aldehyde group; a carboxylic acid group or salt thereof; an alkyl group containing at least one carboxylic ester, a carboxylic acid or salt thereof, ether, aldehyde, ketone, or sulfoxide group; wherein the compound has at least one carbonyl group (a carbonyl-containing group), that is, at least one of Y$^1$ is —(C=O)— and/or at least one R$^4$ or R$^5$ comprises —(C=O)—, e.g. as in an aldehyde-, ester-, carboxylic acid- (or salt), or ketone-containing group.

In each of the possible R$^4$ or R$^5$ each alkyl group is of a size or molecular weight suitable for use in absorbing sulfur dioxide, in aqueous solutions. Preferably each such alkyl group, including the substituted groups such as hydroxyalkyl groups, have from 1 to about 12 carbon atoms, more preferably, from 1 to about 6 carbon atoms. Each alkyl group or alkyl portion of an aralkyl group is suitably cyclic, branched or unbranched, and optionally is at least partially unsaturated (alkylene), e.g. vinyl or allyl groups or substituents.

In Formula III each alkyl group is unsubstituted or inertly substituted, that is substituted with groups which do not interfere undesirably with use of the compounds to absorb sulfur dioxide, with solubility of the compounds in water or with regeneration of an aqueous solution of the compound after sulfur dioxide is absorbed. The groups preferably also exhibit chemical and thermal stability because the compounds often undergo repeated absorption/regeneration cycles. Exemplary of such inert substituents are hydroxyl groups; carbonyl groups including those in aldehydes, ester, acids, carboxylates and ketones; and sulfoxides.

Preferred substituents, R$^4$ and R$^5$ on compounds of Formula III are those which enhance solubility in water, preferably without decreasing the capacity for absorbing SO$_2$, the regenerability of the compound after absorption, or the chemical and heat stability under conditions of use. Preferred substituents are generally hydrogen, formyl groups, alkyl groups and groups having at least one hydroxyl, or carboxylic acid or salt group, more preferably alkyl groups unsubstituted or having such substituents, most preferably alkyl groups having at least one hydroxyl group, that is hydroxyalkyl groups. When R$^4$ or R$^5$ includes a salt, the salt suitably has any counterion which allows water solubility, preferably such a metal cation, more preferably an alkali metal counterion, or mixtures thereof.

Preferred compounds among compounds of Formula III include piperidones and piperidines having at least one carbonyl-containing substituent on the ring nitrogen and/or on at least one ring carbon atom; compounds wherein R$^4$ is other than hydrogen, more preferably a carbonyl-containing group, most preferably a formyl or carboxylate group, on a carbon atom within one carbon atom from, more preferably adjacent to, the nitrogen; compounds having more than one oxygen atom, more preferably more than one carbonyl oxygen. Formyl groups on nitrogen generally enhance regenerability, while carboxylic acids and salts generally enhance absorption of $SO_2$.

Exemplary of compounds of Formula III are piperidines having a carbonyl group such as 2-piperidone; 1-methyl-2-piperidone; 3-carbethoxy-2-piperidone; 4-piperidone; 1-acetyl-4-piperidone; 1-formyl piperidine; 1-formyl piperidone; ethyl piperidine-2-carboxylate; ethyl 1-piperidine propionate; 1-piperidine propionic acid; 3-hydroxy-2-piperidone; 2,4-piperidinedione; 3,3-piperidone hydrochloride; 1-piperidine carboxaldehyde; 4-piperidine carboxaldehyde; 2,2,6,6-tetramethyl-4-piperidone and the like. Preferred compounds include 1-methyl-2-piperidone; 3-carbethoxy-2-piperidone; 1-acetyl-4-piperidone; 1-formyl piperidine; 1-piperidine propionic acid.

Such piperidones are commercially available and are known in the art. Piperidones are prepared by methods within the skill in the art, for instance by processes taught in German 858,397 (Dec. 8, 1952); by Herning and Stromberg, *Journal of the American Chemical Society* 74, 2680-1 (1952); or by Vladimir Dabydovin, *Chem. Tech.* (Berlin) 7, 647-655 (1955), all involving rearrangement of certain oximes; U.S. Pat. No. 2,702,801 (Donaldson) teaching conversion of secondary nitrocompounds, e.g. nitrocyclopentane.

Piperidines having carbonyl-containing substituents on the ring nitrogen are commercially available, and are prepared by methods within the skill in the art, for instance by procedures such as those taught by Jones, et al. in *J. Chem. Soc.*, (1952), pp. 3261-3264, teaching the reaction of carbon dioxide and a pyridine to produce formyl piperidines; Hess, et al. in *Chem.* 50, 385-9 (1917) teaching synthesis of 2-piperidine carboxylate by oxidation of picoline with formaldehyde; Treibs, et al. in *Chem. Ber.*, 89, 51-57 (1956) teaching preparation of such compounds as 3-piperidine-propionate and methyl-2-piperidinopropionate by reaction of nitrite and bromosubstituted dicarboxylic acids via oximino and dioximino dicarboxylic acids; Drake, et al. in *J. Amer. Chem. Soc.*, 56, 697-700 (1934) teaching preparation of alkyl-1-piperidinopropionate, e.g. by reaction of certain bromo substituted acrylic esters and piperidine; or Sternberg, et al. in *J. Amer. Chem. Soc.*, 75, 3148-3152 (1953) teaching preparation of N-formyl piperidine by reacting dicobalt octacarbonyl with piperidine in the presence of a Lewis base.

Piperidines having carbonyl-containing substitution on a ring carbon, such as 3-carbethoxy-2-piperidone, are commercially available and are known in the art. They are prepared by methods within the skill in the art, for instance by procedures such as those taught in U.S. Pat. No. 2,680,116 (Trick, et al.) which teaches treatment of such compounds as dioxodialkylpiperidines or derivatives thereof with formic acid esters followed by reduction to produce piperidine-diones; British Patent 742,733, (Roche Products, Ltd.) which teaches reaction of certain dioxoialkyltetrahydropyridines with formaldehyde and reduction to produce certain alkyltetrahydropyridinediones and alkylpiperidinediones; Shechter, et al. in *J. Amer. Chem. Soc.*, 73, 3087-3091 (1951) which teaches preparation of certain 2-piperidones by reacting cyclopentanones with hydrazoic acid sulfuric acids. Other methods of preparing 2-piperidones are taught by Langley et al. in *J. Amer. Chem. Soc.*, 74, 2012-15 (1952) and by Horning, et al. Ibid, pp. 2680-2681.

Another preferred class of scrubbing amines includes piperazines having carbonyl groups, preferably compounds of the formula:

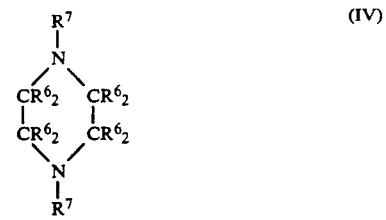

wherein each of $R^6$ and $R^7$ is independently hydrogen; an alkyl group; a hydroxyalkyl group; an aldehyde group; a carboxylic acid or salt group; or an alkyl group containing at least one carboxylic ester, carboxylic acid or salt, ether, aldehyde, ketone or sulfoxide; and wherein at least one $R^6$ or $R^7$ is a carbonyl-containing group, such as an aldehyde group, a carboxylic acid containing group, a carboxyl ester group, or a ketone-containing group.

In each of the possible $R^6$ or $R^7$ groups, each alkyl group is of a size or molecular weight suitable for use in absorbing sulfur dioxide in aqueous solutions. Preferably each alkyl group, including the substituted groups such as hydroxyalkyl groups, have from 1 to about 12 carbon atoms, more preferably, from 1 to about 6 carbon atoms. Each alkyl group is suitably cyclic, branched or unbranched and optionally is at least partially unsaturated (alkylene), e.g. vinyl or allyl groups or substituents.

In Formula IV each alkyl group is unsubstituted or inertly substituted, that is substituted with groups which do not interfere undesirably with use of the compounds to absorb sulfur dioxide, with solubility of the compounds in water or with regeneration of an aqueous solution of the compound after sulfur dioxide is absorbed. The groups preferably also exhibit chemical and thermal stability because the compounds often undergo repeated absorption/regeneration cycles. Exemplary of such inert substituents are hydroxyl groups; carbonyl groups including those in aldehydes, esters, acids, ketones; and sulfoxides.

Preferred substituents, $R^6$ and $R^7$, on compounds of Formula IV are those which enhance solubility in water, preferably without decreasing the capacity for absorbing $SO_2$, the regenerability of the compound after absorption, or the chemical and heat stability under conditions of use. Preferred substituents are generally hydrogen, formyl groups, alkyl groups and groups having at least one hydroxyl or carboxylic acid or salt group, more preferably alkyl groups unsubstituted or having such substituents, most preferably alkyl groups having at least one hydroxyl group, that is hydroxylalkyl groups. When $R^6$ or $R^7$ include a salt, the salt suitably has any counterion which allows water solubility, preferably a metal cation, more preferably an alkali metal counterion, or mixtures thereof.

Preferred compounds among compounds of Formula IV include piperazines having at least one carbonyl-containing substituent on the ring nitrogen and/or on at least one ring carbon atom; compounds wherein $R^7$ is other than hydrogen, more preferably a carbonyl-containing group, most preferably a formyl or carboxylate group; compounds in which at least one carbonyl group is on a carbon atom within one carbon atom from, more preferably adjacent to, the nitrogen; compounds having more than one oxygen atom, more preferably more than one carbonyl oxygen. Formyl groups on nitrogen generally enhance regenerability, while carboxylic acids and salts generally enhance absorption of $SO_2$.

Exemplary of the compounds of Formula IV are piperazines such as ethyl-1-piperazine carboxylate; 1,4-piperazine-dicarboxylic acid; 1-succinylpiperazine; 1-formylpiperazine; 4-formylpiperazine; 1,4-diformylpiperazine; 1-formyl-2-methyl-piperazine; 1-formyl-2,5-dimethylpiperazine; 1-(2-hydroxyethyl)-4-sulfoxyl piperazine and the like. Preferred compounds include ethyl-1-piperazine carboxylate; 1,4-diformylpiperazine; and 1-succinylpiperazine.

Such piperazines are commercially available and are known in the art. They are prepared by methods within the skill in the art, for instance by processes taught in Kirk-Othmer *Encyclopedia of Chemical Technology*, vol. 2, pp. 295-299 (1978).

Another preferred class of scrubbing amines include anhydrides of monocarboxylic amino acids (hereinafter anhydrides), preferably compounds of the formula:

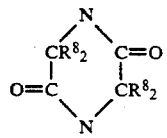

(V)

wherein each $R^8$ is independently hydrogen; an alkyl group; a hydroxyalkyl group; an aldehyde group; a carboxylic acid or salt group; or an alkyl, aryl, or aralkyl group containing at least one carboxylic ester, carboxylic acid or salt, ether, aldehyde, ketone or sulfoxide group.

In each of the possible $R^8$ groups, each alkyl group is of a size or molecular weight suitable for use in absorbing sulfur dioxide in aqueous solutions. Preferably each alkyl group, including the substituted groups such as hydroxyalkyl groups, has from 1 to about 12 carbon atoms, more preferably, from 1 to about 6 carbon atoms. Each alkyl group is suitably cyclic, branched or unbranched and optionally is at least partially unsaturated (alkylene), e.g. vinyl or allyl groups or substituents.

In Formula V, each alkyl group is unsubstituted or inertly substituted, that is substituted with groups which do not interfere undesirably with use of the compounds to absorb sulfur dioxide, with solubility of the compounds in water of with regeneration of an aqueous solution of the compound after sulfur dioxide is absorbed. The groups preferably also exhibit chemical and thermal stability because the compounds often undergo repeated absorption/regeneration cycles. Exemplary of such inert substituents are hydroxyl groups; carbonyl groups including those in aldehydes, esters, acids, salts and ketones; and sulfoxides.

Preferred substituents, $R^8$ on compounds of Formula V are those which enhance solubility in water, preferably without decreasing the capacity for absorbing $SO_2$, the regenerability of the compound after absorption, or the chemical and heat stability under conditions of use. Preferred substituents are generally hydrogen, formyl groups, alkyl groups and groups having at least one hydroxyl or carboxylic acid or salt group, more preferably alkyl groups unsubstituted or having such substituents, most preferably alkyl groups having at least one hydroxyl group, that is hydroxyalkyl groups. Where $R^8$ includes a salt, the salt suitably has any counterion which allows water solubility, preferably a metal cation, more preferably an alkali metal counterion, or mixtures thereof.

Preferred compounds among compounds of Formula V include anhydrides produced from amine-containing acids, such as glycine anhydride, 1,4-dimethyl-2,5-piperazinedione and the like.

Exemplary of preferred anhydrides are 2,5-piperazinedione (glycine anhydride); 1-methyl-2,5-piperazinedione 1,4-dimethyl-2,5-piperazinedione; 1-(2-hydroxyethyl)-2,5-piperazinedione; 1,4-bis(2-hydroxyethyl)-2,5-piperazinedione; 1-(2-hydroxyethyl)-4-methyl-2,5-piperazinedione; 4-(2-hydroxyethyl)-2,5-piperazinedione 1-(2-hydroxyethyl)-3-methyl-2,5-piperazinedione 1,3,4,6-tetramethyl-2,5-piperazinedione; 1-(2-hydroxyethyl)-3,3-dimethyl-2,5-piperazinedione; 1,4-bis(2-hydroxyethyl)-3,3-dimethyl-2,5-piperazinedione; 1-butyl-2,5-piperazinedione; 1,4-dibutyl-2,5-piperazinedione 3,3'-dibutyl-2,5-piperazinedione and the like. Preferred compounds include 2,5-piperazinedione and 1,4-dimethyl-2,5-piperazinedione.

Such anhydrides are commercially available and are known in the art. They are prepared by methods within the skill in the art, for instance by processes taught in *Synthetic Methods of Organic Chemistry*, W. Theilheimer, Vol. 13, p. 224 (1959).

Another preferred class of $SO_2$ scrubbing amines includes heterocyclic compounds having at least one ring nitrogen atom of the formula:

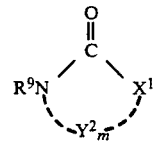

(VI)

wherein $X^1$ is $-O-$, $-NR^9-$, or $-N=$; each $Y^2$ is independently $-(CR^{10}_2)-$, $-(C=O)-$, $-O-$, $NR^9-$, $-N=$, or $-C(R^{10})=$; each $R^9$ or $R^{10}$ is independently hydrogen; an alkyl group; a hydroxyalkyl group; an aldehyde group; a carboxylic acid or salt group; or an alkyl group containing an aldehyde group, a carboxylic acid or salt group, ketone, carboxylic ester, ether, or sulfoxide group; and m is an integer preferably of from 2 to about 4, more preferably from about 2 to about 3.

In each of the possible $R^9$ or $R^{10}$ groups, each alkyl group is of a size or molecular weight suitable for use in absorbing sulfur dioxide, preferably in aqueous solutions. Preferably each alkyl group, including the substituted groups such as hydroxyalkyl groups, have from 1 to about 12 carbon atoms, more preferably from 1 to about 6 carbon atoms. Each alkyl group is suitably cyclic, branched or unbranched and optionally is at least partially unsaturated (alkylene groups), e.g. vinyl or allyl groups or substituents.

In Formula VI each alkyl group is unsubstituted or inertly substituted, that is substituted with groups which do not interfere undesirably with use of the compounds to absorb sulfur dioxide, with solubility of the compounds in water or with regeneration of an aqueous solution of the compounds after sulfur dioxide is absorbed. The groups preferably also exhibit chemical and thermal stability because the compounds often undergo repeated absorption/regeneration cycles. Exemplary of such inert substituents are hydroxyl groups; carbonyl groups including those in aldehydes, esters, acids, carboxylate groups and ketones; and sulfoxides.

Preferred substituents, $R^9$ and $R^{10}$, on compounds of Formula VI are those which enhance solubility in water, preferably without decreasing the capacity for absorbing $SO_2$, the regenerability of the compound after absorption, or the chemical and heat stability under conditions of use. Preferred substituents are generally hydrogen or alkyl (or alkylene) groups and such groups having at least one hydroxyl group, carboxyalkyl groups or salts thereof, more preferably hydrogen, alkyl groups or alkyl groups having at least one hydroxy group, that is hydroxyalkyl groups, most preferably hydroxyalkyl groups. When $R^9$ or $R^{10}$ includes a salt, the salt suitably has any positive counterion which allowed solubility in water, preferably such a metal cation, more preferably an alkali metal counterion, or mixtures thereof.

Preferred compounds among compounds of Formula VI include hydantoins ($X^1= -NR^9-$, and $m=2$), triazinones (of N-substituted isocyanuric acids) ($X^1= -NR^9-$, $m=3$, one of $Y^2= -NR^9-$), pyrimidinones ($X^1= -NR^9-$, $m=3$) and oxazolidones ($X^1= -O-$, $m=2$), having indicated structure.

Among compounds represented by Formula VI, hydantoins are preferred because of their ready availability, ease of production from basic raw materials (like ammonia, hydrogen cyanide, carbon dioxide and ketones).

Exemplary of the hydantoins are hydantoin itself; 5,5-dimethylhydantoin; N-methylhydantoin; N-butylhydantoin; N,N'-dimethylhydantoin; N-(2-hydroxyethyl) hydantoin; N,N'-bis(2-hydroxyethyl) hydantoin; N-hydroxymethyl-hydantoin; N,N'-bis(hydroxymethyl)hydantoin; N-(2-hydroxyethyl)-5,5-dimethylhydantoin; N,N'-bis (2- hydroxyethyl)dimethylhydantoin; N-hydroxymethyl-5,5-dimethylhydantoin; N,N'-bis (hydroxymethyl)-5,5-dimethylhydantoin and the like. Preferred compounds include: hydantoin; 5,5-dialkylhydantoins such as 5,5-dimethylhydantoin and 5-ethyl-5-methylhydantoin; and hydroxyalkylated hydantoins and derivatives thereof; because such compounds exhibit good solubility, high regenerability, good thermal stability, low vapor pressure (high boiling point), and are readily available in commercial quantities.

Such hydantoins are commercially available and are known in the art. They are prepared by methods within the skill in the art, for instance by processes taught in Kirk-Othmer, *Encyclopedia of Chemical Technology*, Vol. 12, pp. 692-711 (1978).

Exemplary of the triazinones are 1,3,5-triazine-2,4,6-trione; trihydroxy-1,3,5-triazine-2,4,6-trione; trimethyl-1,3,5-triazine-2,4,6-trione; triallyl-1,3,5-triazine-2,4,6-trione and the like. 1,3,5-Tris(2-hydroxyalkyl)-2,4,6-triones, and the like are also suitably used. Triallyl-1,3,5-triazine-2,4,6-trione is preferred because of relatively high regenerability, good stability, and low vapor pressure (high boiling point).

Triazinones are commercially available and are known in the art. They are prepared by methods within the skill in the art, for instance by procedures such as those taught in Kirk-Othmer, *Encyclopedia of Chemical Technology*, Vol. 7, pp. 397-405 (1979).

Among compounds of Formula VI, pyrimidinones, including propyleneureas and pyrimidinediones, are preferred for their solubility in water. Exemplary of the propyleneureas are $N^1,N^3$-dimethyl-propyleneurea; propyleneurea; $N^1$-methyl-propyleneurea; $N^1,N^3$-dimethylpropyleneurea; $N^1$-(2-hydroxyalkyl)-propyleneurea; $N^1,N^3$-bis(2-hydroxyalkyl)-propyleneurea; 4,6-dihydroxypyrimidinedione; 4,5-dimethyl-propyleneurea; 2,4-pyrimidinedione; and the like. $N^1,N^3$-Dimethylpropyleneurea is preferred because of relatively high regenerability, good thermal stability, and low vapor pressure. The structural representation of $N^1,N^3$-dimethylpropyleneurea is:

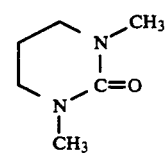

Pyrimidinones are known in the art. They are prepared by methods within the skill in the art, for instance by procedures such as those taught in *Synthetic Methods of Organic Chemistry*, W. Theilheimer, Vol. 25, pp 215, (1971).

Among compounds of Formula VI, oxazolidones including oxazolidinediones are preferred for their relatively high solubility as compared to other compounds having the same degree and type of substitution.

Exemplary of the oxazolidones are 2-oxazolidone; 3-methyl-2-oxazolidone; 5-methyl-2-oxazolidone; 3-(2-hydroxyethyl)-2-oxazolidone; 4,5-dimethyl-2-oxazolidone; 3-(2-hydroxyethyl)-4,5-dimethyl-2-oxazolidone; 2,4-oxazolidinedione; 5,5-dipropyl-2,4-oxazolidinedione and the like. 2-Oxazolidone is preferred because of relatively high regenerability, low vapor pressure (high boiling point) and good thermal stability.

Oxazolidones are commercially available and are known in the art. They are prepared by methods within the skill in the art, for instance by procedures such as those taught in Kirk-Othmer *Encyclopedia of Chemical Technology*, Vol. 4, pp. 762 (1978).

Another preferred class of scrubbing amines include compounds having an ethylene diamine structure, preferably compounds of the formula:

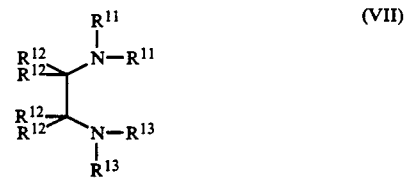

(VII)

wherein each $R^{11}$, $R^{12}$ or $R^{13}$ is independently hydrogen; an alkyl group; a carboxylic acid group; a hydroxyalkyl group; an aldehyde group; or an alkyl group containing a carboxylic ester, a carboxylic acid or salt, ether, aldehyde, ketone or sulfoxide group; wherein at least one $R^{11}$ or $R^{13}$ is a carboxymethyl group ($-CR_2-COOH$ or $CR_2-COO-X^3$, where $X^3$ is a counter ion) and at least one $R^{11}$ or $R^{13}$ is hydrogen, preferably at least one $R^{11}$ is carboxymethyl and at least one $R^{13}$ is hydrogen.

In each of the possible $R^{11}$, $R^{12}$ or $R^{13}$ groups, each alkyl group is of a size or molecular weight suitable for use in absorbing sulfur dioxide in aqueous solution. Preferably each alkyl group, including the substituted groups such as hydroxyalkyl groups, have from 1 to about 12 carbon atoms, more preferably from 1 to about 6 carbon atoms. Each alkyl group is suitably cyclic, branched or unbranched and optionally is at least partially unsaturated (alkylene), e.g. vinyl or allyl groups or substituents.

In Formula VII, each alkyl group is unsubstituted or inertly substituted, that is substituted with groups which do not interfere undesirably with use of the compounds to absorb sulfur dioxide, with solubility of the compounds in water or with regeneration of an aqueous solution of the compounds after sulfur dioxide is absorbed. The groups preferably also exhibit chemical and thermal stability because the compounds often undergo repeated absorption/regeneration cycles. Exemplary of such inert substituents are hydroxyl groups; carbonyl groups including those in aldehydes, esters, acids or salts, and ketones; and sulfoxides. 4 Preferred substituents, $R^{11}$, $R^{12}$ or $R^{13}$ on compounds of Formula VII are those which enhance solubility in water, preferably without decreasing the capacity for absorbing $SO_2$, the regenerability of the compound after absorption, or the chemical and heat stability under conditions of use. Preferred substituents are generally hydrogen; formyl groups; alkyl groups; and alkyl groups having at least one hydroxyl, carboxylic acid, ester or salt, aldehyde or ketone group; more preferably, unsubstituted alkyl groups and alkyl having at least one hydroxyl, carboxylic acid or salt substituent, most preferably alkyl groups having at least one hydroxyl group, that is hydroxyalkyl groups. When there are salts present, the counter ion is suitably any which allows the compounds to be soluble, preferably an alkali metal ion.

Exemplary of compounds of Formula VII are ethylenediaminemonoacetic acid (EDMA); ethylenediaminediacetic acid (EDDA), both symmetrical (s-EDDA) and unsymmetrical (u-EDDA); ethylenediaminetriacetic acid (ED3A); 1-methyl EDMA; 1,4-dimethyl EDMA; 1-hydroxyethyl EDDA; 1-formyl EDDA; and the like. Preferred compounds include s-EDDA, u-EDDA, EDMA and ED3A, and more preferred are s-EDDA and EDMA. Such compounds are commercially available or can be prepared by methods within the skill in the art such as that taught in R. M. Genik-Sas-Berezowsky et al. in *Canadian Journal of Chemistry*, 48, 163–175 (1970).

Among compounds of Formula VII solids can be conveniently transported and used. Such compounds are also of sufficiently low volatility to avoid overhead loss of the absorbent during thermal regeneration.

The scrubbing amines are generally employed in sulfur dioxide scrubbing solutions at a concentration of from about 0.1 molar up to their saturation concentration in water.

The polyelectrolyte-containing scrubbing solution is introduced directly to the sulfur dioxide scrubbing system at start-up and/or is added as a makeup to replenish alkali losses, but in either case, it is not necessary in this embodiment to add the polyelectrolyte separately.

The polyelectrolytes of the present invention are water-soluble polymeric quaternary amines. By "water-soluble" it is meant that the polyelectrolytes are soluble or dispersible in the alkali and/or sulfite solution at an effective concentration. The polyelectrolytes preferably have a molecular weight sufficiently high so that it is non-volatile, and especially at least about 10,000 daltons. On the other hand, the molecular weight should not be so high that the polyelectrolyte is not soluble or dispersible in solution. Representative polyelectrolytes include, for example:

(a) the reaction product of starch and chlorohydroxypropyl trimethyl ammonium salt;
(b) the reaction product of starch and glycidyl trimethylammonium chloride;
(c) copolymers of acrylamide and quaternary ammonium compounds such as copoly[acrylamide-diallylmethyl($\beta$-propionmamido) ammonium halide], copoly[acrylamide-($\beta$-methacryloyloxyethyl) trimethylammonium methyl sulfate], copoly[acrylamide-diallyl($\beta$-carbamoethyl)ammonium chloride], acrylamidopropylbenzyldimethylammonium hydroxide and the like;
(d) poly(diallyldimethylammonium chloride);
(e) quaternized vinyllactam-acrylamide copolymers, such as the reaction product obtained by treating acrylamidevinyllactam copolymer with formaldehyde and dimethylamine in the presence of methyl chloride or phenyl methylene chloride and the like;
(f) polyvinylbenzyltrimethyl ammonium chloride;
(g) poly[diallylmethyl(cyanoethyl) ammoniummethyl sulfate], poly[diallylmethyl-(2-methyloxycarbamoylethyl) ammonium methyl sulfate], poly[diallyl($\beta$-hydroxyethyl)(2-carbamoylethyl) ammonium chloride], poly[dialkylmethyl($\beta$-propionamido) ammonium chloride], poly[N(dimethylaminomethyl)]-acrylamide, poly(2-vinylimidazolinium bisulfate), poly(N-dimethylaminopropyl)methacrylamide and the like.

The aforementioned cationic polymers used in the invention are well known and are available under various tradenames. See, for example, J. Vostrcil, et al., *Commercial Organic Flocculants* (Noyes Data Corp. 1972) which is incorporated by reference herein. Other useful polyelectrolytes are set forth in *J. Macromol. Science — Chem. A*4, pp 1327–1417 (1970) which is also incorporated by reference herein.

The polyelectrolytes are employed in amounts which are effective to inhibit the rate of oxidation of sulfite therein. It is contemplated that effective ranges of the polyelectrolyte are from about 1 ppm to about 3000 ppm, preferably from about 5 to about 500 ppm and especially from about 10 to about 300 ppm. While amounts higher than this may be employed if desired, there is generally no advantage to be obtained by employing excessive amounts of the polyelectrolyte and it is generally uneconomical. On the other hand, if amounts substantially less than this are employed, there may not be sufficient polyelectrolyte to effect a substantial reduction in the sulfite oxidation rate.

The alkali solution containing the polyelectrolyte is advantageously employed in sulfur dioxide scrubbing systems which are well known in the art. Typically, the scrubbing solution is intimately contacted with a sulfur dioxide-containing fluid stream at appropriate conditions, e.g. a pH of 4–10 and a temperature of 0°–95° C. The sulfur dioxide is absorbed into the scrubbing solution, generally as sulfite and bisulfite. The sulfites-containing solution is then typically regenerated for reuse in the scrubbing system, used as a sulfite source for another process, and/or disposed of, or the like. Particulars of the operation of sulfur dioxide scrubbing systems, especially with respect to the preferred piperazinone/morpholinone amine scrubbing agents, are set forth in the above mentioned U.S. Pat. Nos. 4,530,704 and 4,783,327. With respect to the scrubbing amines, it may be mentioned that thermal regeneration suitably takes place at any temperature below the thermal decomposition temperature of the scrubbing amine, preferably at a temperature of from about 75° C. to about 150° C., most preferably from about 90° C. to about 120° C., at atmospheric pressure. Reduced pressure or pressures above atmospheric are suitable, but about atmospheric (e.g. 0 to 10 pounds per square inch gauge (psig) (0 to 68.95 pascals (Pa) gauge)) is convenient. Regeneration at about 100° C. at atmospheric pressure is particularly convenient because water in the aqueous solution boils and can be refluxed while the $SO_2$ is released.

Regenerability of an absorbent such as a scrubbing amine is a measure of the ability of the absorbent to release $SO_2$ (so that the absorbent may be reused). Regenerability is determined by measuring the bisulfated concentrations in a solution of known concentration of absorbent which has been saturated with $SO_2$ as in the determination of $SO_2$ absorption capacity. This solution is referred to herein as the enriched solution. Then a portion of the enriched solution is heated to strip $SO_2$ as a gas. For purposes of the measurement, stripping is done at the boiling point of the solution, about 100° C. with $N_2$ sparge at 0.5 SCFH (standard cubic feet per hour) (equivalent to $3.9 \times 10^{-6}$ m$^3$/s at 16° C.) for 4 hours. During the stripping, additional water is frequently added to make up the water loss due to evaporation. A sample of this stripped solution is analyzed for bisulfite and bisulfate concentration of the original enriched solution. The difference in combined bisulfite and bisulfate concentrations between the stripped and enriched $SO_2$ solution is used to calculate the percent regenerability of each solution using the equation:

$$\% \text{ Regenerability} = 100 \frac{[1 - (\text{Total bisulfite plus bisulfate concentration in stripped solution})]}{(\text{Total bisulfite plus bisulfate concentration in enriched solution})}$$

Percent regenerability of the scrubbing amine absorbents used in the practice of the invention is preferably at least about 30, more preferably at least about 50, most preferably at least about 60 percent.

The inhibition of the oxidation of the sulfites with the polyelectrolyte according to the present invention is usually desirable to minimize alkali consumption, to facilitate pH control, to minimize precipitation and scale formation and for other various reasons, depending on the particulars of the selected scrubbing system.

EXAMPLE

Sodium sulfite (1.26 g) and sodium bisulfite (1.04 g) were diluted to 100 ml total volume with OMNISOL brand ultrapure water and sufficient AGEFLOC WT-40 (40% poly(diallyldimethylammonium chloride)) to obtain 40 ppm of poly(DADMAC). Air was sparged into the solution at a rate of 425 cc per minute. At periodic time intervals a 1.0 ml aliquot was removed and analyzed by iodine titration for total sulfites (including bisulfite). The following results were obtained:

| TIME ELAPSED (HOURS:MINUTES: SECONDS) | SULFITES CONCENTRATION (MOLES/LITER) | PERCENT OF INITIAL SULFITES |
|---|---|---|
| 0:00:18 | 0.198 | 99 |
| 0:02:25 | 0.189 | 94 |
| 0:12:18 | 0.154 | 77 |
| 0:27:02 | 0.100 | 50 |
| 0:41:30 | 0.098 | 49 |

-continued

| TIME ELAPSED (HOURS:MINUTES: SECONDS) | SULFITES CONCENTRATION (MOLES/LITER) | PERCENT OF INITIAL SULFITES |
|---|---|---|
| 2:05:00 | 0.044 | 22 |

COMPARATIVE EXAMPLE

The foregoing example was repeated, except that no AGEFLOC WT-40 or other polyelectrolyte was added to the solution. The results are as follows:

| TIME ELAPSED (HOURS:MINUTES: SECONDS) | SULFITES CONCENTRATION (MOLES/LITER) | PERCENT OF INITIAL SULFITES |
|---|---|---|
| 00:18 | 0.175 | 88 |
| 02:45 | 0.172 | 86 |
| 09:30 | 0.109 | 55 |
| 17:40 | 0.078 | 39 |
| 29:30 | 0.073 | 37 |
| 46:50 | 0.055 | 28 |

The foregoing examples illustrate the effectiveness of the polyelectrolytes of the present invention in stabilizing sulfite solutions against oxidation.

The foregoing description of the invention is illustrative and explanatory thereof, and various modifications will become apparent to those skilled in the art in view thereof. It is intended that all such modifications which fall within the scope and spirit of the appended claims be embraced thereby.

What is claimed is:

1. In a process for scrubbing sulfur dioxide from a gas stream comprising the step of contacting the gas stream with an aqueous alkali solution to form sulfites therein, the improvement wherein the alkali solution contains:

an effective amount of a cationic polyelectrolyte to inhibit oxidation of the sulfites to sulfates, said polyelectrolyte being a water soluble polymer containing quaternary amine groups; and an amine scrubbing agent present in said alkali solution at a concentration of at least about 0.1 molar selected from the group consisting of:

(i) piperazinone or morpholinone compounds of the formula:

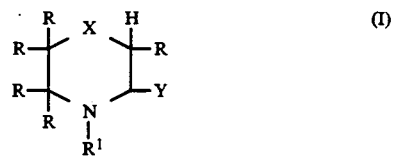

(I)

wherein X is oxygen or $>NR^2$, Y is $H_2$ or oxygen, R is hydrogen, an alkyl group having one to six carbon atoms or aryl or aralkyl group having from six to twelve carbon atoms, $R^1$ is hydrogen, an alkyl or hydroxyalkyl group having from one to six carbon atoms, or an aryl or aralkyl group having from six to twelve carbon atoms, and $R^2$ is $R^1$ or a 2-hydroxyethyl group of the formula:

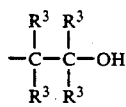
(II)

wherein $R^3$ is hydrogen or an alkyl group having one or two carbon atoms;

(ii) compounds represented by the formula;

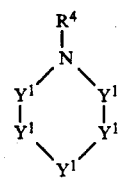
(III)

wherein each $Y^1$ is independently $-(CR^5{}_2)-$, $-(CR^5)=$ or $-(C=O)-$ and each $R^4$ or $R^5$ is independently hydrogen; an alkyl group; a hydroxyalkyl group; an aldehyde group; a carboxylic acid group or salt thereof; an alkyl group containing at least one carboxylic ester, carboxylic acid or salt thereof, ether, aldehyde, ketone, or sulfoxide group; wherein the compound has at least one carbonyl group;

(iii) compounds represented by the formulae;

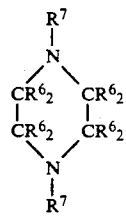
(IV)

wherein each $R^6$ and $R^7$ is independently hydrogen; an alkyl group; a hydroxyalkyl group; an aldehyde; a carboxylic acid or salt group; an alkyl group containing at least one carboxylic ester, carboxylic acid or salt, ether, aldehyde, ketone or sulfoxide; and wherein at least one of $R^6$ or $R^7$ is a carbonyl-containing group; or

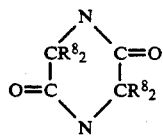
(V)

wherein each $R^8$ is independently hydrogen; an alkyl group; a hydroxyalkyl group an aldehyde group; a carboxylic acid or salt group or an alkyl, aryl, or aralkyl group containing at least one carboxylic ester, carboxylic acid or salt, ether, aldehyde, ketone or sulfoxide group;

(iv) compounds represented by the formula:

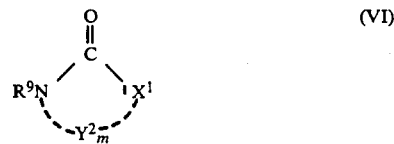
(VI)

wherein $X^1$ is $-O-$, $NR^9-$, or $-N=$; each $Y^2$ is independently $-(CR^{10}{}_2)-$, $-(C=O)-$, $-O-$, $NR^9-$, $-N=$, or $-C(R^{10})=$; each $R^9$ or $R^{10}$ is independently hydrogen; an alkyl group; a hydroxyalkyl group; an aldehyde group; a carboxylic acid or salt group; or an alkyl group containing an aldehyde group, a carboxylic acid or salt group, ketone, carboxylic ester, ether, or sulfoxide group; and m is an integer; and (v) compounds represented by the formula:

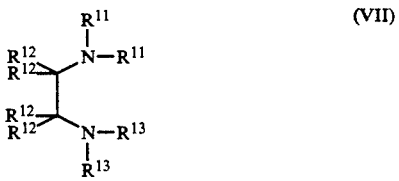
(VII)

wherein each $R^{11}$, $R^{12}$ and $R^{13}$ is independently hydrogen; an alkyl group; a carboxylic acid group; a hydroxyalkyl group; an aldehyde group; or an alkyl group containing a carboxylic ester, a carboxylic acid or salt, ether, aldehyde, ketone or sulfoxide group; wherein at least one of $R^{11}$ and $R^{13}$ is a carboxymethyl group and at least one of $R^{11}$ and $R^{13}$ is hydrogen.

2. The improvement of claim 1, wherein said polyelectrolyte has a molecular weight of at least about 10,000 daltons.

3. The improvement of claim 1, wherein the polyelectrolyte concentration is from about 1 to about 3000 ppm in the alkali solution.

4. The improvement of claim 2, wherein the polyelectrolyte concentration is from about 5 to about 500 ppm in the alkali solution.

5. The improvement of claim 2, wherein the polyelectrolyte concentration is from about 10 to about 300 ppm in the alkali solution.

6. The improvement of claim 2, wherein said polyelectrolyte comprises the reaction product of starch and chlorohydroxypropyl trimethyl ammonium salt.

7. The improvement of claim 2, wherein said polyelectrolyte comprises the reaction product of starch and glycidyl trimethylammonium chloride.

8. The improvement of claim 2, wherein said polyelectrolyte is selected from copolymers of acrylamide and quaternary ammonium compounds.

9. The improvement of claim 2, wherein the polyelectrolyte comprises poly(diallyldimethylammonium chloride).

10. The improvement of claim 2, wherein the polyelectrolyte is selected from quaternized vinyllactamacrylamide copolymers.

11. The improvement of claim 2, wherein the polyelectrolyte comprises polyvinylbenzyltrimethyl ammonium chloride.

12. The improvement of claim 2, wherein the polyelectrolyte is selected from poly[diallylmethyl(cyanoethyl) ammonium methyl sulfate], poly[diallylmethyl-(2-methyloxycarbamoylethyl) ammonium methyl sulfate], poly[diallyl($\beta$-hydroxyethyl)(2-carbamoylethyl) ammonium chloride], poly[dialkylmethyl($\beta$-propionamido) ammonium chloride], poly[N-(dimethylaminomethyl)]acrylamide, poly(2-vinylimidazolinium bisulfate), and poly(N-dimethylaminopropyl)-methacrylamide.

13. The improvement of claim 1, wherein said amine scrubbing agent comprises a piperazinone selected from the group consisting of 4-(2-hydroxyethyl)-2-piperazinone, 4-(2-hydroxyethyl)-1-methyl-2-piperazinone, 4-(2-hydroxyethyl)-3-methyl-2-piperazinone, 4-(2-hydroxyethyl)-4-(2-hydroxyethyl)-5-methyl-2-piperazinone, 3-ethyl-4-(2-hydroxyethyl)-2-piperazinone, 6-ethyl-4-(2-hydroxyethyl)-2-piperazinone, 4-(2-hydroxyethyl)-5,6-dimethyl-2-piperazinone, 1-ethyl-4-(2-hydroxyethyl)-2-piperazinone, 4-(2-hydroxyethyl)-3-phenyl-2-piperazinone, 1,4-bis( 2-hydroxyethyl)-2-piperazinone, 4-(2-hydroxyethyl)-2-piperazinone, 4-(2-hydroxypropyl)-2-piperazinone, 4-(2-hydroxybutyl)-2-piperazinone and 4-(2-hydroxypropyl)-6-methyl-2-piperazinone.

14. The improvement of claim 1, wherein at least one of $Y^1$ is —(C═O)—, or at least one of $R^4$ and $R^5$ comprises an aldehyde, ester, carboxylic acid or salt, or ketone.

15. The improvement of claim 1, wherein in the compound of formula (III), in addition to the carbonyl group, at least one of $R^4$ and $R^5$ is selected from the group consisting of alkyl groups, formyl groups and groups having at least one hydroxy group, or carboxylic acid or salt group, and wherein each alkyl group has from 1 to about 6 carbon atoms.

16. The improvement of claim 1, wherein at least one amine scrubbing agent is a piperidine having at least one carbonyl-containing group on a ring carbon atom.

17. The improvement of claim 1, wherein at least one of $Y^1$ is —(C═O)—.

18. The improvement of claim 1, wherein at least one of $R^4$ and $R^5$ is an alkyl group which is unsubstituted or has at least one hydroxyl, carboxylic acid or salt substituent.

19. The improvement of claim 1, wherein said amine scrubbing agent is selected from the group consisting of 2-piperidone; 1-methyl-2-piperidone; 3-carbethoxy-2-piperidone; 4-piperidone; 1-acetyl-4-piperidone; 1-formyl piperidine; 1-formyl piperidone; ethyl piperidine-2-carboxylate; ethyl 1-piperidine propionate; 1-piperidine propionic acid; 3-hydroxy-2-piperidone; 2,4-piperidinedione; 3,3-diethyl-2,4-piperidinedione; 5-hydroxy-2-piperidone; 4-piperidine carboxaldehyde; and 2,2,6,6-tetramethyl-4-piperidone.

20. The improvement of claim 1, wherein said amine scrubbing agent is selected from the group consisting of:
1-methyl-2-piperidone; 3-carbethoxy-2-piperidone; 4-piperidone; 1-acetyl-4-piperidone; 1-formyl piperidine; and 1-piperidine propionic acid.

21. The improvement of claim 1, wherein the amine scrubbing agent has a percent regenerability of at least about 30 percent.

22. The improvement of claim 21, wherein the absorbent has a CS of at least about 0.05.

23. The improvement of claim 22, wherein the absorbent has a CS of at least about 0.5.

24. The improvement of claim 1, wherein the amine scrubbing agent comprises a piperazine of formula V having at least one carbonyl-containing group on the ring nitrogen and/or on the ring carbon atom.

25. The improvement of claim 23, wherein at least one of $R^6$ and $R^7$ is selected from the group consisting of alkyl groups and alkyl groups having at least one hydroxyl, carboxylic acid or salt group.

26. The improvement of claim 1, wherein said amine scrubbing agent is selected from the group consisting of ethyl-1-piperazine carboxylate, 1,4-diformylpiperazine, 1-succinylpiperazine, 1-(2-hydroxyethyl)-4-sulfoxylpiperazine, 1-aminoethylpiperazine, 1,4-bis(2-hydroxyethyl)piperazine, 1-hydroxyethylpiperazine, 1-formylpiperazine, 1-methylpiperazine, 1,4-dimethylpiperazine, 1-piperazinecarboxylic acid, 1,4-piperazinedicarboxylic acid.

27. The improvement of claim 1, wherein said amine scrubbing agent is selected from the group consisting of glycine anhydride, 1-methyl-2,5-piperazinedione, 1,4-dimethyl-2,5-piperazinedione; 1-hydroxyethyl-1,5-piperazinedione, 1-aminoethyl-2,5-piperazinedione, 1,4-bis(hydroxyethyl)-2,5-piperazinedione, 1-formyl-2,5-piperazinedione, 1,4-bis(hydroxyethyl)-2,5-piperazinedione, (carboxymethyl)-2,5-piperazinedione, 3-hydroxyethyl-2,5-piperazinedione, 3,6-bis(hydroxyethyl)-2,5-piperazinedione, 3-methyl-2,5-piperazinedione, and 3-formyl-2,5-piperazinedione.

28. The improvement of claim 1, wherein said amine scrubbing agent is a hydantoin.

29. The process of claim 28, wherein said amine scrubbing agent is selected from the group consisting of hydantoin; 5,5-dimethylhydantoin; N-methylhydantoin; N-butylhydantoin; N,N'-dimethylhydantoin; N-hydroxymethylhydantoin; N,N'-bis(hydroxymethyl)-hydantoin; N-(2-hydroxyethyl)hydantoin; N,N'-bis($\alpha$-hydroxyethyl)hydantoin; N-(2-hydroxyethyl)-5,5-dimethylhydantoin; N,N'-bis(2-hydroxyethyl)dimethylhydantoin; N-hydroxymethyl-5,5-dimethylhydantoin; N,N'-bis(hydroxymethyl)-5,5-dimethylhydantoin.

30. The improvement of claim 1, wherein said amine scrubbing agent is a triazinone.

31. The improvement of claim 30, wherein said amine scrubbing agent is selected from the group consisting of 1,3,5-triazine-2,4,6-trione; trihydroxy-1,3,5-triazine-2,4,6-trione; trimethyl-1,3,5-triazine-2,4,6-trione; and triallyl-1,3,5-triazine-2,4,6-trione.

32. The improvement of claim 1, wherein said amine scrubbing agent is a pyrimidinone.

33. The improvement of claim 32, wherein said amine scrubbing agent is selected from the group consisting of $N^1,N^3$-dimethyl-propyleneurea; propyleneurea; $N^1$-methyl-propyleneurea; $N^1,N^3$-dimethyl-propyleneurea; $N^1$-(2-hydroxyalkyl)propyleneurea; $N^1,N^3$-bis(2-hydroxyalkyl)propyleneurea; 4,5-dihydroxy-propyleneurea; 4,5-dimethyl-propyleneurea; 2,4-pyrimidinedione.

34. The improvement of claim 1, wherein said amine scrubbing agent is an oxazolidone.

35. The improvement of claim 34, wherein said amine scrubbing agent is selected from the group consisting of 2-oxazolidone; 3-methyl-2-oxazolidone; 5-methyl-2-oxazolidone; 3-(2-hydroxyethyl)-2-oxazolidone; 4,5-dimethyl-2-oxazolidone; 3-(2-hydroxyethyl)-4,5-dimethyl-2-oxazolidone; 2,4-oxazolidinedione; and 5,5-dipropyl-2,4-oxazolidinedione.

36. The improvement of claim 1, wherein at least one of $R^{11}$ is a carboxymethyl group and at least one of $R^{13}$ is a hydrogen group.

37. The improvement of claim 36, wherein each $R^{12}$ is selected from hydrogen; formyl groups; alkyl groups;

and alkyl groups having at least one hydroxyl, carboxylic acid, ester or salt, aldehyde or ketone group.

38. The improvement of claim 37, wherein at least one of $R^{12}$ is a hydroxyalkyl group.

39. The improvement of claim 1, wherein said amine scrubbing agent is selected from ethylenediaminemonoacetic acid (EDMA), ethylenediaminediacetic acid (EDDA), ethylenediaminetriacetic acid (ED3A) and their derivatives, and mixtures thereof.

* * * * *